(12) United States Patent
Ballweg et al.

(10) Patent No.: US 10,727,707 B2
(45) Date of Patent: Jul. 28, 2020

(54) RELUCTANCE ROTOR LAMINATION HAVING AN OPENING FOR STRESS REDUCTION

(71) Applicant: Siemens Aktiengesellschaft, München (DE)

(72) Inventors: Marion Ballweg, Bundorf (DE); Klaus Büttner, Hollstadt (DE)

(73) Assignee: Siemens Aktiengesellschaft, Munich (DE)

( * ) Notice: Subject to any disclaimer, the term of this patent is extended or adjusted under 35 U.S.C. 154(b) by 632 days.

(21) Appl. No.: 15/115,408

(22) PCT Filed: Sep. 23, 2014

(86) PCT No.: PCT/EP2014/070254
§ 371 (c)(1),
(2) Date: Jul. 29, 2016

(87) PCT Pub. No.: WO2015/113656
PCT Pub. Date: Aug. 6, 2015

(65) Prior Publication Data
US 2017/0012481 A1 Jan. 12, 2017

(30) Foreign Application Priority Data
Jan. 31, 2014 (EP) .................... 14153448

(51) Int. Cl.
*H02K 1/22* (2006.01)
*H02K 1/28* (2006.01)
(Continued)

(52) U.S. Cl.
CPC ............... *H02K 1/22* (2013.01); *H02K 1/246* (2013.01); *H02K 1/28* (2013.01); *H02K 15/02* (2013.01);
(Continued)

(58) Field of Classification Search
CPC ..................................................... H02K 1/22; H02K 1/246; H02K 1/28; H02K 15/02; H02K 15/028; H02K 2201/06
(Continued)

(56) References Cited

U.S. PATENT DOCUMENTS 5,233,254 A * 8/1993 Fisher ...................... H02K 1/24
310/185
5,818,140 A 10/1998 Vagati
(Continued)

FOREIGN PATENT DOCUMENTS

DE 10 2009 047 485 A1 6/2011
EP 1 734 639 A2 12/2006
(Continued)

*Primary Examiner* — Alfonso Perez Borroto
*Assistant Examiner* — Ahmed Elnakib
(74) *Attorney, Agent, or Firm* — Henry M. Feiereisen LLC (57) ABSTRACT

The invention relates to a reluctance rotor lamination that permits easy assembly of a rotor, in particular by means of press fitting, wherein there must be sufficient stability. For this purpose, a reluctance rotor lamination (18) is provided, wherein an opening (6, 42) for stress reduction is arranged on each d axis half (32) in each flux-conducting section (24), such that a partial flux-conducting section (36, 37) is formed on each of the two sides of each d axis half (32) in each flux-conducting section (24). The sum of the smallest cross-section of each of the two partial flux-conducting sections (36, 37) is substantially greater than or equal to a smallest cross-sectional area of the flux-conducting section (36, 37) perpendicular to each partial d axis half (32) radially above the opening, such that the opening (6, 42) does not cause magnetic impairment.

7 Claims, 4 Drawing Sheets

(51) Int. Cl.
*H02K 15/02* (2006.01)
*H02K 1/24* (2006.01)

(52) U.S. Cl.
CPC ....... *H02K 15/028* (2013.01); *H02K 2201/06* (2013.01)

(58) Field of Classification Search
USPC ....... 310/211, 261, 216, 168, 212, 61, 60 A, 310/261.1, 12.18, 49.43, 106
See application file for complete search history.

(56) References Cited

U.S. PATENT DOCUMENTS

| | | | | |
|---|---|---|---|---|
| 6,259,181 | B1 * | 7/2001 | Kawano | H02K 1/246 310/162 |
| 2006/0078452 | A1 * | 4/2006 | Park | F04C 23/008 418/55.6 |
| 2006/0284512 | A1 * | 12/2006 | Lee | H02K 1/246 310/216.008 |
| 2007/0126304 | A1 * | 6/2007 | Ito | H02K 1/2766 310/156.53 |
| 2008/0258585 | A1 * | 10/2008 | Kataoka | H02K 1/24 310/68 B |
| 2013/0119819 | A1 * | 5/2013 | Lendenmann | H02K 1/246 310/216.107 |
| 2015/0069879 | A1 * | 3/2015 | Papini | H02K 1/246 310/216.123 |

FOREIGN PATENT DOCUMENTS

| | | | |
|---|---|---|---|
| JP | S5666147 | * | 6/1981 |
| JP | 2000-050548 | A | 2/2000 |
| JP | 2008-275385 | A | 11/2008 |
| JP | 2008275485 | A | 11/2008 |
| JP | 2012-196033 | A | 10/2012 |
| JP | 2012196033 | * | 10/2012 |
| SU | 1497687 | A1 | 7/1989 |

* cited by examiner

RELUCTANCE ROTOR LAMINATION HAVING AN OPENING FOR STRESS REDUCTION

CROSS-REFERENCES TO RELATED APPLICATIONS

This application is the U.S. National Stage of International Application No. PCT/EP2014/070254 filed Sep. 23, 2014, which designated the United States and has been published as International Publication No. WO 2015/113656 and which claims the priority of European Patent Application, Ser. No. 14/153,448.7, filed Jan. 31, 2014, pursuant to 35 U.S.C. 119(a)-(d).

BACKGROUND OF THE INVENTION

The present invention relates to a reluctance rotor lamination which is substantially embodied in a circular disk shape. It has a central opening in the center and a flux-conducting section extending radially from the central opening to a connecting ring located on the outer edge of the reluctance rotor lamination along a d-axis (preferred direction of magnetization). The invention also relates to a reluctance rotor having a laminated core made of a plurality of reluctance rotor laminations and a method for the production thereof.

Reluctance rotor laminations of this kind with corresponding openings are known from patent U.S. Pat. No. 5,818,140 A. A laminated core and a corresponding rotor can be assembled from the reluctance rotor laminations. The punched-out sections are used to produce curved, strip-shaped lamination sections that serve as flux-conducting sections and conduct the magnetic flux in the way necessary for the provision of the required reluctance of the rotor. Due to the punched-out sections, air, i.e. a non-magnetic region that acts as a magnetic flux inhibitor, is located between the individual flux-conducting sections. The strip-shaped flux-conducting sections result in a high torque yield. Due to the non-magnetic regions, the magnetic permeability of the laminated core is relatively low in the direction of the q-axis, i.e. the magnetic inhibition direction. The strip-shaped flux-conducting sections extend transversely to the q-axis and, in the circumferential direction, connect adjacent poles of the rotor arranged in each case on the d-axis (preferred directions of magnetization). However, the punched-out sections for the provision of the non-magnetic regions or the formation of the flux-conducting sections result in a weakening of the mechanical stability of the laminated core such that the rotor described is not suitable for high rotational speeds, in particular not for rotational speeds in excess of than 3000 revolutions per minute. For this reason, reluctance motors of the type described are, for example, not suitable for the rotational speeds required for motor vehicles with electric drives.

Therefore, due to the mode of operation, the rotor lamination in a reluctance motor (in short: reluctance rotor lamination) is especially embodied with greatly varying radial stability with respect to the d-axis and q-axis. For example, the d-axis is formed with a flux-conducting section with a continuous lamination from the inner diameter to the outer diameter, while the q-axis is interrupted by flux inhibitors.

For example, the rotor laminations are connected to the shaft by a cylindrical press fit on the shaft. In the case of high speeds, the oversize of the press fitting should be higher, since the centrifugal force results in an expansion of the inner diameter of the rotor lamination and the torque transmission onto the shaft is reduced. In addition, feather keys for torque transmission would be unfavorable since the groove to be introduced into the laminations would further reduce the stability.

The different degrees if stability in the axes results in different degrees of deformation during the pressing-on and hence in impermissible stresses on the outer ribs or on the outer connecting ring of the rotor lamination, in particular on the rib directly next to the d-axis. The continuous material in the d-axis passes as a deformation from the inner diameter to the outer diameter, while in the adjacent region, due to the flux inhibitors, there is no deformation from inside to out.

In addition, the ribs holding the flux-conducting sections together are subject to extreme stress from the centrifugal force on rotation. In the case of a relatively high tensile stress, which can actually be caused by the press fit, there is no reserve or only little reserve for the centrifugal force loading. Therefore, a reluctance rotor of this kind is only suitable for relatively low speeds.

One possibility for optimization consists in the integration of closing shapes between the shaft and the rotor lamination to enable the withdrawal of the press fit forces with the simultaneous transmission of a high torque. The closing shapes used could be grooves and springs, flat parts or even shafts with polygonal cross sections. Although these measures do enable tensile stresses to be avoided as there is no need for press fitting, as indicated above, in some circumstances the lamination is also destabilized by grooves and the production or connection of the shafts is complicated.

SUMMARY OF THE INVENTION

Hence, the object of the present invention consists in the suggestion of a reluctance rotor lamination with which a simple-to-produce rotor can be assembled which is not exposed to excessive tensile stresses.

According to the invention, this object is achieved by a reluctance rotor lamination
which is embodied substantially in a circular disk shape and comprises one or more d-axes, wherein each d-axis has two d-axis halves separated by the center of the reluctance motor lamination, having
a central opening in the center of the reluctance rotor lamination and
in each case, a flux-conducting section extending radially from the central opening to a connecting ring located on the outer edge of the reluctance rotor lamination along each d-axis half, wherein
an opening for stress reduction is arranged in each flux-conducting section on the respective d-axis half such that a partial flux-conducting section is formed on each of the two sides of the respective d-axis half in the respective flux-conducting section and
in each case the sum of each of the two partial flux-conducting sections is substantially greater than or equal to a smallest cross-sectional area of the flux-conducting section perpendicular to the respective d-axis half radially above the opening.

Advantageously, the opening in each flux-conducting section of the plurality of d-axis halves reduces the rigidity of the reluctance rotor lamination in the direction of the d-axis. In this context, the opening is arranged and/or shaped such that the respective flux-conducting section is not narrowed any further than the narrowing of the flux-conducting section at its narrowest point without the opening. This means that the magnetic flux is not impaired any more than at the narrowest coherent point of the flux-conducting section, which typically lies radially completely outside on the connecting ring. This achieves an ideal compromise between the reduction in rigidity and the magnetic impairment. Compared to the prior art, according to the invention, the reluctance rotor laminations do not need to be connected to one other to form the laminated core. They are preferably exclusively connected directly to a shaft of the rotor in the region of the central opening.

For example, it is possible to do without connecting pins, non-positive connections between reluctance rotor laminations arranged adjacent to one another or the like. According to the invention, the power transmission between the reluctance rotor lamination and the shaft preferably takes place immediately or directly and, to be precise, without the agency of any further components. With respect to the reluctance rotor, the object is achieved by a laminated core comprising reluctance rotor laminations according to the invention.

The opening for stress reduction can be completely surrounded by the material of the reluctance rotor lamination. This means that the opening lies completely within the respective flux-conducting section. This has the advantage that the entire circumference of the central opening can be arranged on a purely cylindrical shaft by means of friction locking. In particular, an edge of the central opening of the reluctance rotor lamination, preferably in the q-region between the openings for stress reduction, can be embodied as complementary to the shaft. This can achieve a high degree of power transmission while to a large extent avoiding overloading of the reluctance rotor lamination. The stress reduction relates to the reduction of mechanical stresses.

In an alternative embodiment, a hollow space of the opening is connected to a hollow space of the central opening. This means that the two hollow spaces merge directly into one another or that the boundaries of the hollow spaces intersect or merge into one another.

It is especially possible for two of the d-axes to be arranged perpendicularly to one another and two q-axes to be arranged bisecting the angles between the d-axes, wherein curved, strip-shaped lamination sections are arranged perpendicularly on the q-axes and the lamination sections are separated from one another by punched-out sections. This enables the implementation of a four-pole reluctance rotor the poles of which are arranged offset by 90° in each case. The q-axes with the magnetic inhibition direction are located centrally between two adjacent poles in each case. Therefore, adjacent q-axes and d-axes are offset by 45° with respect to one another.

Moreover, in addition to the opening or opening(s) for stress reduction, the reluctance rotor lamination can comprise at least one identification opening. Therefore, in addition to the central opening, the openings for stress reduction and the punched-out sections for the purpose of flux reduction, at least one opening is also provided as an identification to simplify the orientation of the reluctance rotor lamination. This is helpful with the core assembly. As a rule such identification openings are much smaller than all the other punched-out sections since they must not exert any influence on the magnetic flux or the mechanical stability.

According to one embodiment, it is suggested that the central opening is embodied for the exclusive connection of the reluctance rotor lamination to a shaft of a reluctance rotor. As a result, the reluctance rotor lamination can exclusively be fastened to the rotor shaft in the region of the central opening. As a result, no further fastening options are required. The reluctance rotor lamination is preferably exclusively connected to the rotor shaft in the region of the central opening. There is no need for a connection to adjacent reluctance rotor laminations. The central opening is preferably embodied such that that it can be connected to the shaft in the form of a fit, in particular a press fit, with the shaft. This enables a reliable connection to be achieved.

According to a further embodiment, it is suggested that the reluctance rotor lamination comprises a chamfer guide element, which is preferably arranged on an outer circumference of the reluctance rotor lamination. In addition, the chamfer guide element can also be arranged in the region of the central opening of the reluctance rotor laminations. The chamfer guide element can, for example, be formed by a projection, a recess, combinations thereof and/or similar items. The chamfer guide element is preferably embodied such that it substantially does not create any imbalance during operation as prescribed. For example, chamfer guide elements lying radially opposite one another having substantially the same embodiment can be embodied on the reluctance rotor lamination. Furthermore, the chamfer guide elements are preferably embodied for interaction with a chamfer guide rail such that it is possible to arrange the reluctance rotor laminations offset in a prespecifiable manner with respect to one another in the laminated core. It can also be provided that the chamfer guide element is removed after the completion of the reluctance rotor. This is particular advantageous in the case of radially protruding chamfer guide elements.

A laminated core which can be connected to a shaft can be formed from a plurality of reluctance rotor laminations of this kind. In this context, it is advantageous for the shaft to be connected in a rotary manner to the laminated core by friction locking only. This means, that apart from further openings protruding therein, the central opening can be circular and similarly the shaft can have a purely circular cylindrical embodiment. This enables a very simple shaft design to be achieved.

The laminated core can also be chamfered. In this context, the individual laminations of the laminated core are offset in a rotary manner from one another by a low angular amount as a result of which the torque ripple of an electric machine and in particular of a synchronous reluctance motor can be reduced.

Preferably, the openings on each individual d-axis or on all d-axes have the same dimensions. Similarly, the openings on each individual d-axis or on all the d-axes should have the same distance from the center of the reluctance rotor lamination. This enables stresses to be reduced in all regions of the reluctance rotor lamination.

With respect to the method, for the achievement of the object, it is suggested that, with a method for the production of a reluctance rotor comprising a laminated core made of a plurality of reluctance rotor laminations and a shaft, reluctance rotor laminations according to the invention are used, wherein the method comprises the following steps:

stacking a number of reluctance rotor laminations required for the intended function of the laminated core to form a stack, wherein the reluctance rotor laminations are arranged coaxially with respect to one another, in each case, arranging an end plate on opposite stack ends of the stack, heating the stack to a prespecified temperature and introducing a shaft with a lower temperature than the reluctance rotor laminations into an opening formed by central opening of the reluctance rotor laminations, wherein a diameter of the shaft is selected such that, in the case of temperature equalization between the stack and the shaft, a press fit is formed.

The use of the reluctance rotor laminations according to the invention enables further fastening options to be dispensed with. This not only enables a particularly simple production to be achieved, there is also no need for additional fastening means, which, in addition to costs, would also entail special measures with respect to operation as intended. Preferably, the stack can be prepared in a mold, heated to the prespecified temperature, wherein then an unheated shaft can be introduced into the opening formed by the central openings. For example, the temperature difference can be 100 to 250° C., preferably 150 to 220° C., particularly preferably 180° C. The diameter of the opening and the shaft are matched to one another such that, in the case of temperature equalization or temperature compensation between the reluctance rotor laminations and the shaft, a press fit is formed.

It is also suggested that in each case a sleeve with a sleeve opening is arranged at the stack ends, wherein the sleeve opening has the same diameter as the central openings of the reluctance rotor laminations. The provision of the sleeves enables any fanning out of the reluctance rotor laminations to be avoided to a large extent during the production of the laminated core, in particular during the introduction of the shaft into the opening. To this end, it can be provided that the sleeves are fixed in their respective positions. In addition, the sleeves enable stabilization of the laminated core overall to be ensured during operation as intended. The stack ends are preferably supported by the sleeves.

It is also suggested that the stack be formed in a thread mold with a chamfer guide rail. The thread mold is in particular used to arrange the reluctance rotor laminations adjacent to one another in the desired orientation and to hold them therein during the formation of the stack.

In this context, the chamfer guide rail can ensure the orientation of the reluctance rotor laminations with respect to one another. Hence, the thread mold is a reliable way of enabling a chamfer of the laminated core to be achieved.

It is also suggested that the stack be subjected to pressure at its stack ends. This enables the reluctance rotor laminations to be heated to a uniform temperature in a short time. At the same time, it enables the reluctance rotor laminations to be in each case arranged directly adjacent to one another and unwanted air gaps to be avoided to a large extent.

It has been found to be particularly advantageous for the shaft to be introduced when the stack is subjected to pressure. This enables the reluctance rotor laminations of the stack also to retain their position in the event of mechanical influences during the introduction of the shaft.

In addition, it is suggested that the pressure act on the stack during the temperature equalization. This can ensure that the temperature of the stack changes in an as uniform a way as possible. This results in a reliable press fit with respect to the introduced shaft. This can enable distortion, inhomogeneities or the like to be avoided to a large extent.

BRIEF DESCRIPTION OF THE DRAWING

The present invention will now be explained in more detail with reference to the attached drawings, which show.

DETAILED DESCRIPTION OF PREFERRED EMBODIMENTS

The exemplary embodiments described below represent preferred embodiments of the present invention.

Figure 1:
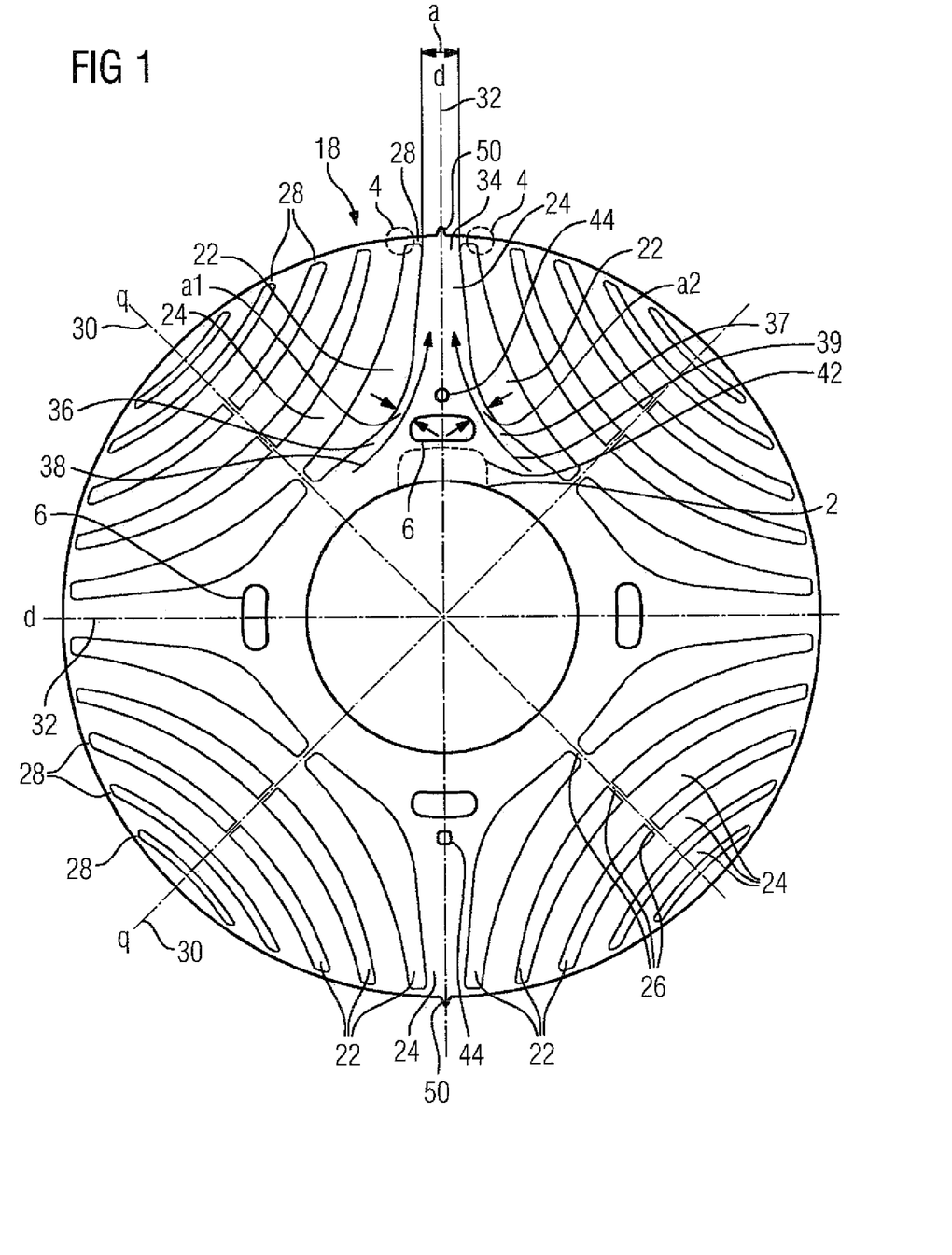
FIG. 1 a schematic top view of a reluctance rotor lamination according to the present invention, FIG. 2 a schematic perspective view of a laminated rotor core with a plurality of reluctance rotor laminations as shown in FIG. 1, FIG. 3 a schematic sectional view of the stacking of the number of reluctance rotor laminations required for the intended function of the laminated rotor core to form a stack, FIG. 4 a schematic sectional view of an arrangement of in each case an end plate and heating of the stack, FIG. 5 a schematic sectional view of the introduction of the rotor shaft and the establishment of a press fit FIG. 6 a schematic perspective view of a reluctance rotor according to the invention and FIG. 7 a schematic perspective view of an alternative embodiment for an arrangement in each case of an end plate and heating of the stack based on the laminated rotor core as shown in FIG. 2.

The reluctance rotor lamination 18 depicted in FIG. 1 comprises openings 22 that form magnetic inhibitors. As with all other openings, the openings 22 are typically formed by punching-out. They form non-magnetic regions and therefore act as magnetic flux inhibitors. Hence, flux-conducting pieces are produced between the openings 22 in which the magnetic flux is conducted during magnetization as prescribed for operation.

The reluctance rotor lamination 18 depicted in FIG. 1 is used for a four-pole reluctance rotor. Accordingly, the reluctance rotor lamination 18 comprises two d-axes standing perpendicular to one another representing the preferred directions of magnetization and which in each case have d-axis halves 32 separated by the center of the reluctance rotor lamination 18. The preferred directions are characterized by flux-conducting pieces 24 which for the most part extend continuously on the respective d-axis halves 32 apart from a central opening 2 that serves to receive a shaft.

The openings 22 that serve as magnetic inhibitors extend substantially in an arched shape from one pole to the adjacent pole. In addition, they are substantially strip-shaped. For purposes of stability, they may be interrupted by ribs 26. Hence, strip-shaped, arched flux-conducting sections 24 are also form between the arched, strip-shaped openings 22.

The arched, non-magnetic openings 22 between adjacent poles extend perpendicular to the q-axes 30 that bisect the angles between the d-axes. Therefore, there is magnetic field inhibition on the q-axis 30. For more details on the mode of operation, reference is made to U.S. Pat. No. 5,818,140 A from Vagati mentioned in the introduction.

Figure 2:
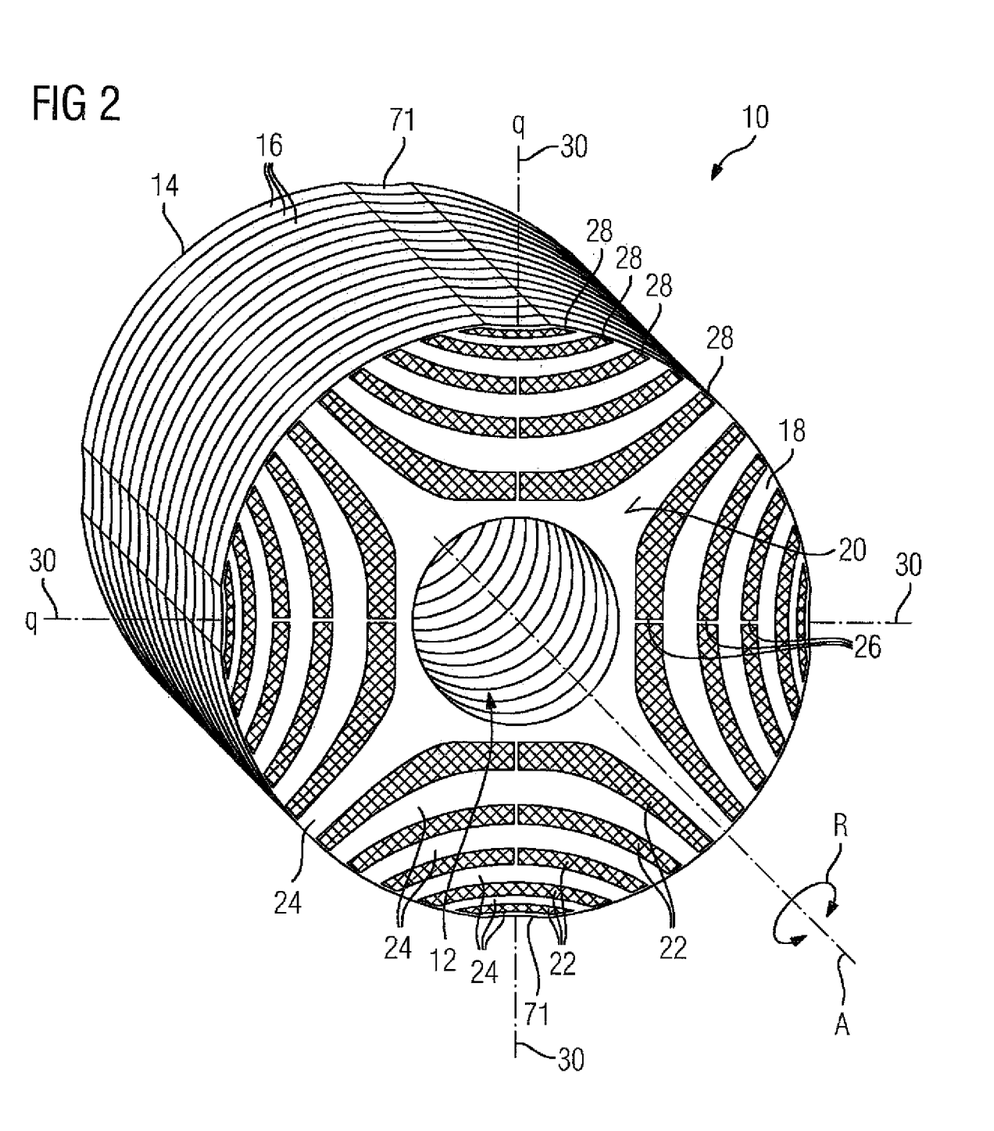

FIG. 2 shows a reluctance rotor or, to be concise, a rotor 10 without a shaft. The rotor 10 can be installed in a reluctance motor. For example, the reluctance motor can be a drive motor for an electrically driven motor vehicle. In installed state, a shaft of the reluctance motor, which is not shown in FIG. 2, is inserted through a through-opening 12 of the rotor 10 formed by the central openings 2. The rotor 10 is preferably pressed onto the shaft. The shaft, and hence the rotor 10, is then mounted rotatably about an axis of rotation A such that the rotor 10 is able to complete a rotation R about the axis of rotation A within a stator (not shown) of the reluctance motor. A diameter of the rotor 10 in the radial direction can, for example, be 20 cm or more. A length of the rotor 10 in the axial direction can, for example, be 30 cm or more.

The rotor 10 comprises as a magnetically active part a laminated core 14 formed from a plurality of layers 16 each comprising soft magnetic, in particular ferromagnetic, material. This material originates from the individual laminations as shown in FIG. 1. The layers further comprise electrically insulated partial layers in order to block eddy currents in the laminated core 14. For purposes of clarity, in FIG. 2 only some of the layers 16 are provided with a reference number.

Therefore, each layer 16 is substantially formed by a rotor lamination 18. In FIG. 2, only the rotor lamination 18 located on an end face 20 in the axial direction along the axis A at a front end is provided with a reference number.

The rotor laminations 18 are arranged aligned axially one behind the other in the laminated core 14 such that the openings 22, and accordingly also the flux-conducting sections 24, are in axial alignment as long as no chamfer is provided. The rotor laminations of the layers 16 can all have the same shape.

To ensure the rotor 10 is enclosed on the outer casing, each rotor lamination 18 has an enclosed connecting ring 28 at its outer edge. This also fixes the flux-conducting sections 24.

The example in FIGS. 1 and 2 relates to a four-pole rotor. However, there can also be a greater number of poles. In the most favorable case, the through-hole 12 of the rotor 10 has a circular-cylindrical shape and the associated shaft also has a circular-cylindrical shape. The rotor 10 or the laminated core 14 is then pressed onto the shaft. Hence, the torque is transmitted from the rotor to the shaft solely by means of friction locking. The press fit should correspond to the torque required and can entail very high forces. Due to the structure of the reluctance rotor laminations 18, in the case of known lamination sections, the force is conducted along the d-axis 32 with virtually no reduction from the central opening 2 outward to the connecting ring 28 since, with these known lamination sections, the flux-conducting sections extend continuously from the central opening 2 to the connecting ring 28. In the regions of the connecting ring between the poles or d-axis 32, the force of the press fit is only transmitted to a reduced extent or not at all since the openings 22 prevent this. As a result, very high tensile stresses are produced in the regions 4 of the connecting ring 28 and these could result in the destruction of the rotor laminations 18 and hence the rotor 10.

In order to reduce the deformation or tensile stresses in the regions 4 of the connecting rings 28 on each d-axis half, according to the invention, openings 6 are introduced in the region of the d-axes or d-axis halves 32. An opening 6 of this kind, which can also be created by punching out, interrupts a direct line of force along the respective d-axis half 32. The opening 6 can be deformed such that lower deformations of the connecting ring 28 result in the region of the respective d-axis half 32, and hence also lower tensile stresses in the regions 4 of the connecting rings 28. Hence the risk of fracture or damage is greatly reduced in these regions.

An opening 6 should be dimensioned such that it has virtually no magnetic influence. This can be achieved in that that the magnetic flux in the flux-conducting piece 24 in the region of the d-axis is not inhibited to any greater degree than it is at its narrowest point in direction of flux. Therefore, the flux should not have any incisions more narrow than those in the case of lamination section without the openings 6.

The narrowest point 34 for the magnetic flux in the region of the poles lies at the transition between the flux-conducting piece 24 extending along the respective d-axis half 32 to the connecting ring 28. Here, the lamination is tapered by the adjacent openings 22 closest to each other at this point. Hence, a narrow point with the width a forms on the inner edge of the connecting ring 28. According to the invention, the magnetic flux in the flux-conducting piece 24 should not be restricted any further than at the narrow point 34.

The opening 6 in the flux-conducting section 24 divides this into two in regions and partial flux-conducting sections 36 and 37 are formed to the left and right of the opening 6. Therefore, the partial flux-conducting sections 36 and 37 in each case extend between the opening 6 for stress reduction and the adjacent opening 22 for flux inhibition. Each of the partial flux-conducting sections 36, 37 has for the respective magnetic partial flux 38, 39 in the respective partial flux-conducting section 36, 37 a narrow point with a width a1 or a2. These narrow points are characterized by the smallest cross section of the respective partial flux-conducting sections 36, 37. Therefore, to ensure that the magnetic flux is not further restricted by the opening 6 than by the narrow point 34, the sum of the smallest cross-sectional area of one partial flux-conducting section 36 and the smallest cross-sectional area of the other partial flux-conducting section 37 must not be lower than the cross-sectional area of the flux-conducting section 24 at the narrow point 34. Since, overall, the reluctance rotor lamination has the same thickness, the following must apply: $a1+a2 > a$.

To ensure that the stress relief in the flux-conducting section 24 on the d-axis half 32 is as large as possible, the opening 6 for stress reduction should also be as large as possible. In order simultaneously to be able to observe the above condition, advantageously in each case the sum of the smallest cross section of the two partial flux-conducting sections 36, 37 is substantially selected equal to the smallest cross-sectional area of the flux-conducting section 24 perpendicular to the d-axis 32 radially above the opening 6. Then, preferably the following applies: $a1+a2=a$.

The magnetically relevant smallest cross section at the narrow point 34 is as a rule located perpendicular to the d-axis 32, since, in this region, the magnetic flux moves substantially parallel to the d-axis 32.

Therefore, there is an opening 6 on each d-axis half 32. The location of the opening 6 on the respective d-axis half 32 is in principle freely selectable as long as the above inequality is maintained. Accordingly, as in the example in FIG. 1, the opening 6 can be an enclosed opening completely surrounded by the lamination material. However, the opening 6 can possibly extend as far as the central opening 2 or even protrude therein. This means that the two openings 2 and 6 then merge into one another. An opening of this kind could, for example, have the dashed contour 42 (FIG. 1 only shows one out of four). However, in this context, it is also necessary to maintain the above inequality with respect to the cross-sectional areas or the widths of the narrow points. FIG. 1 should only be treated as a purely schematic view of this variant. However, this embodiment can be in particular be of significance if the openings 22 are moved further down toward the central opening 2 or the central opening 2 is embodied larger.

In the present example, the openings 6 or 42 all have the same shape. They should at least have the same shape in pairs on a d-axis (i.e. the opening on one d-axis half should have the same shape as the opening on the opposite d-axis half) in order to reduce stresses in all regions of the reluctance rotor lamination. In addition, here all the openings 6 or 42 are at the same distance from the center. In any case, here opposite openings should also be at the same distance from the center.

If the opening 6 for the reduction of the mechanical stress merges into the central opening 2, the press fit takes effect to a greater degree or exclusively in the regions of the q-axes. This also keeps the outward deformation in the region of the d-axis 32 low hence also resulting in relief in the regions 4.

Furthermore, identification punched-out sections 44 can be introduced into the reluctance rotor lamination 18. These are used for improved orientation during the connection of the laminated core. They are substantially smaller than the openings 6 for stress reduction and hence have virtually no mechanical influence and virtually no magnetic influence.

Therefore, according to the invention, deformation-reducing measures are achieved in order avoid impermissible stresses in the reluctance rotor lamination. These measures can be achieved by punched-out sections produced with the same punching die as the other punched-out sections in the rotor lamination. In addition, the shaft of the rotor can have a simple cylindrical design. The stresses on the outer ribs or on the connecting ring 28 due to the press fit are reduced, thus providing a reserve for centrifugal force loading and ensuring suitability for higher speeds. Hence, it is possible to dispense with closing shapes in the shaft. The possibility of using a cylindrical shaft means a core chamfer is simple to achieve.

The following describes a production method for a reluctance rotor according to a first exemplary embodiment comprising the laminated core 14 made of a plurality of reluctance rotor laminations 18 according to the invention and a shaft 52, namely the rotor shaft.

Figure 3:
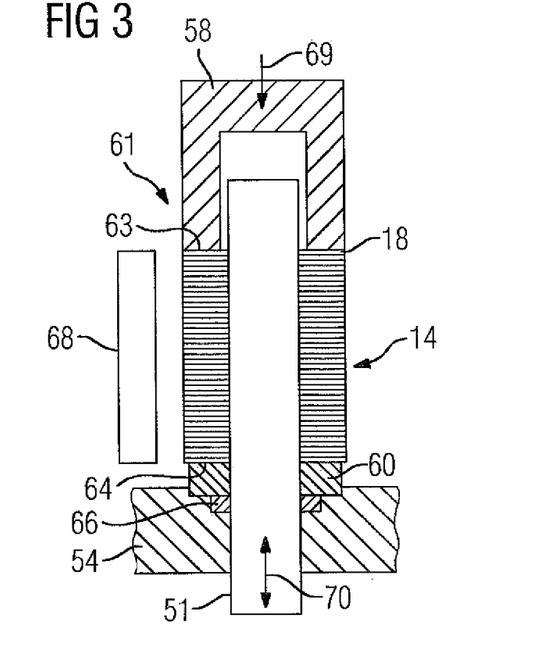

FIG. 3 shows a first step for the production of the reluctance rotor according to which a stack 61 is formed by stacking a number of reluctance rotor laminations 18 required for the intended function of the laminated core 14. In this context, a thread mold 68 is used in which the reluctance rotor laminations 18 are arranged coaxially with respect to one another. It is not evident from the figures that the thread mold 68 comprises a chamfer guide rail which is used to arrange the reluctance rotor laminations 18 in an axial direction 70 in accordance with a chamfer. To this end, the reluctance rotor laminations 18 in each case comprise two radially opposite chamfer guide elements 50 (FIG. 1), which, in the present case, are embodied as small outwardly protruding projections and interact with the guide rail of the thread mold 68. In the present case, it is provided that the guide rail is formed by a helical groove applied on the inner side of a thread opening of the thread mold 68. This ensures that adjacent reluctance rotor laminations 18 are slightly twisted with respect to one another.

It is also evident from FIG. 3 that the stack 61 is created with a vertical alignment. To this end, the thread mold 68 is equipped with a core 51 that engages in the central openings 2 of the reluctance rotor laminations 18. Firstly, a first sleeve 66 is arranged on a base plate 54, said base plate being axially adjacent to an end plate 60. Opposite to the sleeve 66, the first stack end 64 is located on the end plate 66, said first stack end simultaneously forming the first end of the laminated core 14. When the necessary number of reluctance rotor laminations 18 has been arranged in the thread mold 68, a stamp 58 applies pressure 69 to the stack 61 formed in this way. In the present case, a pressure 69 of approximately circa 20 to is provided. This results in a flat arrangement of adjacent reluctance rotor laminations 18 with respect to another, which are threaded into the thread mold 68.

It can further be identified from FIG. 3 that the core 51 can be moved in the axial direction 70. Hence, in compressed condition, the core 51 can be removed from the thread mold 68 vertically downward, wherein in this state, the construction of the stack 61 is retained due to the action of pressure from the force 69 exerted, via the stamp 58.

Figure 4:
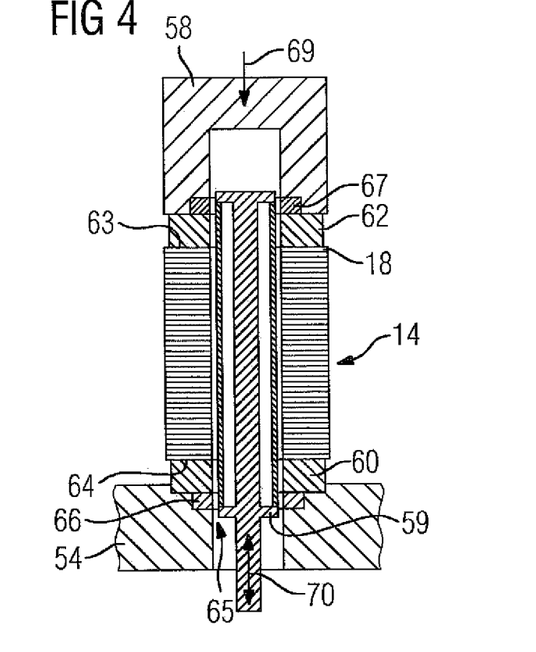

FIG. 4 now shows a further schematic sectional view of a subsequent step in the production of the reluctance rotor according to the invention, wherein now a second end plate 62 is arranged with a second sleeve 67 vertically above. The thread mold 68 and its core 51 have been completely removed. The stamp 58 now impacts the stack 61 with a force 69, which in the present case is 1 to. Now, an induction coil 59 is introduced in the axial direction 70 vertically from below into the opening 65 formed by the central openings 2, which, in FIG. 3, was occupied by the core 51. The induction coil 59 is exposed to an alternating current that generates a magnetic alternating field. This is selected such that thermal heating of the reluctance rotor laminations 18 takes place in the desired way. In the present case, it is provided that inductive heating results in heating to approximately 250° C. At the same time, the stamp 58 exerts an impact 69 of approximately 1 to.

Figure 5:
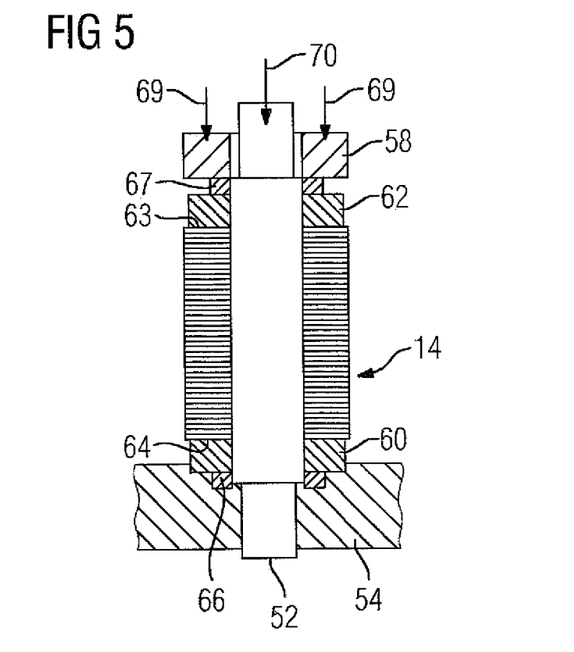

FIG. 5 shows a subsequent step for the production of the reluctance rotor according to the invention, wherein, in the heated state of the laminated core 14 or the stack 61, the induction coil 59 has been removed in the axial direction 70 vertically downward and the rotor shaft 52 is inserted vertically at the top also in the direction 70. The rotor shaft 52 is unheated at a temperature of approximately 20° C. In heated state, the outer diameter of the rotor shaft 52 and the inner diameter of the opening 65 are selected such that, on temperature equalization, i.e. in the present case preferably cooling of the laminated core 14 to approximately 20° C., a press fit is formed between the laminated core 14 and here exclusively the reluctance rotor laminations 18 and the shaft 52.

Figure 6:
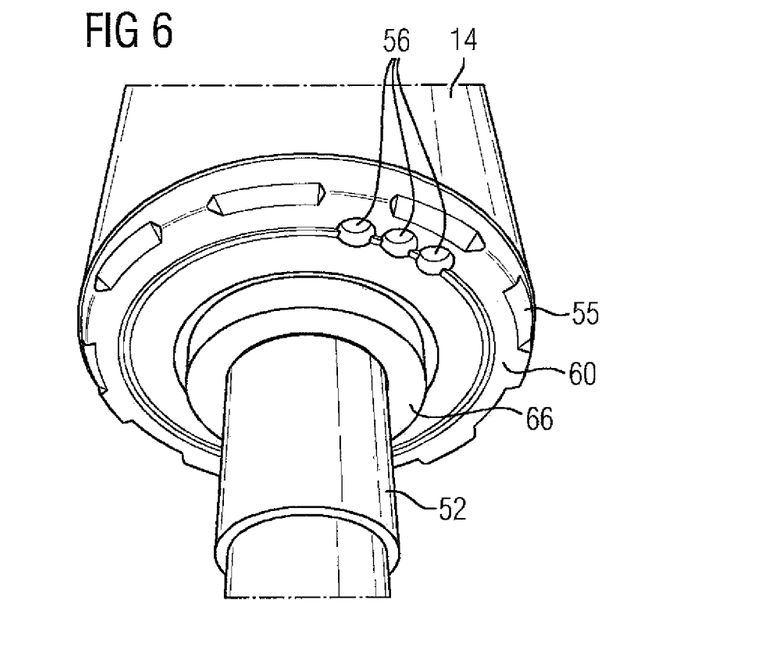

FIG. 6 shows the reluctance rotor produced thereby in a perspective schematic view of the underside according to FIGS. 3 to 5. Here it is further provided that the chamfer guide elements 50 (FIG. 1) are removed so that they do not protrude beyond an outer circumference of the reluctance rotor, for example into an air gap of the subsequent reluctance motor. To this end, it is provided that the chamfer guide elements 50 are removed by means of a rotating method. Alternatively, it is obviously also possible to use other abrasive processing methods that do not substantially impair the integrity of the reluctance rotor.

It is also evident from FIG. 6 that the locking plate 60 comprises an interrupted outside contour 55 on the sleeve side wherein it can be achieved by means of the outside contour 55 that air movement can be created or supported in the interior of the motor. This enables cooling to be improved. In addition, this embodiment enables automatable balancing by means of boring. FIG. 6 depicts corresponding boreholes 56. In the present case, the locking plate 62 is embodied accordingly.

Figure 7:
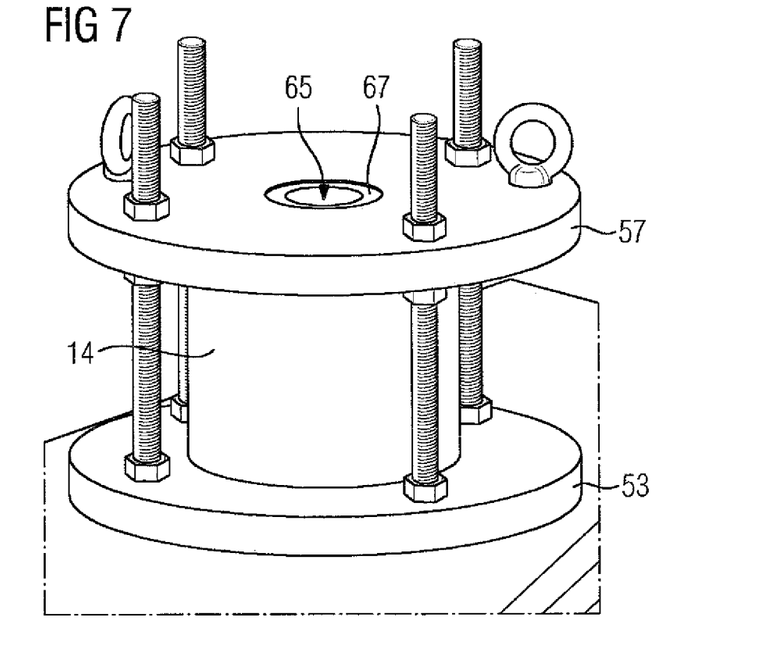

FIG. 7 is a schematic perspective view of an alternative production method for a laminated core 14 according to the invention based on the laminated core 14 as shown in FIG. 2. Unlike the case in FIG. 1, it is provided with the reluctance rotor laminations 18 as shown in FIG. 2 that a chamfer guide element 71 is provided in the form of a circular-segment-shaped recess. The laminated core 14 is created as already described with reference to FIG. 3. The further steps alternatively provide that the laminated core 14 is braced between two clamping plates 53, 57 and in this state heated in a furnace to the desired temperature. In the heated state, the non-heated rotor shaft 52 is then introduced in accordance with the method step as shown in FIG. 5. Following temperature compensation, bracing is achieved by the clamping plates 53, 57. Once again, locking plates and sleeves are provided with this embodiment of the invention, wherein only the sleeve 67 in the clamping plate 57 can be seen in FIG. 7. Since, with this embodiment, the chamfer guide elements 71 of the reluctance rotor laminations 18 do not protrude beyond the outer circumference of the finished reluctance rotor, it is possible in this case to dispense with step of the removal of the chamfer guide elements 71.

The description only serves to explain the invention and does not restrict of the invention.

The advantages, features and embodiments described for the method according to the invention apply analogously to the reluctance rotor according to the invention and vice versa. Consequently, corresponding device features can be provided for method features and vice versa.

What is claimed is:

1. A reluctance rotor, comprising:
a laminated core comprised of a plurality of reluctance rotor laminations and a purely cylindrical shaft, which is connected rotatably to the laminated core by friction locking only, each said reluctance rotor lamination being configured in the shape of a circular disk and comprising at least one d-axis having two d-axis halves separated by a center of the reluctance rotor lamination, said reluctance rotor lamination including a central opening in the center of the reluctance rotor lamination, a connecting ring located on an outer edge of the reluctance rotor lamination, and a flux-conducting section extending radially from the central opening to the connecting ring along each d-axis half and including a hollow opening merging into the central opening on a respective one of the d-axis halves to reduce mechanical stress such that a partial flux-conducting section is formed on each of two sides of the respective d-axis half in the flux-conducting section,
wherein a sum of a smallest cross section of the partial flux-conducting sections is equal to a smallest cross-sectional area of the flux-conducting section perpendicular to the respective d-axis half radially above the opening,
wherein the reluctance rotor laminations are connected to the purely cylindrical shaft exclusively in a region of the central opening so that torque is transmitted from the laminated core to the purely cylindrical shaft solely by friction locking,
wherein the reluctance rotor has a circular-cylindrical shaped through-hole configured to receive the purely cylindrical shaft so that the circular-cylindrical shaped through-hole is formed by the central opening to form a press fit.

2. The reluctance rotor of claim 1, wherein the hollow opening is completely surrounded by a material of the reluctance rotor lamination.

3. The reluctance rotor of claim 1, wherein, on the reluctance rotor lamination, two of the d-axes are arranged perpendicular to one another and two q-axes are arranged bisecting an angle between the d-axes, wherein curved, strip-shaped lamination sections are arranged perpendicularly on the q-axes, with the lamination sections being separated from one another by punched-out sections.

4. The reluctance rotor of claim 1, wherein the reluctance rotor lamination comprises at least one identification opening.

5. The reluctance rotor of claim 1, wherein the hollow opening has on the reluctance rotor lamination a same distance from the center of the reluctance rotor lamination on each individual d-axis or on all d-axes.

6. The reluctance rotor of claim 1, wherein the reluctance rotor laminations comprise a chamfer guide element arranged on an outer circumference of the reluctance rotor laminations.

7. The reluctance rotor of claim 1, wherein the laminated core is chamfered.

* * * * *